United States Patent [19]
Be et al.

[11] Patent Number: 5,919,296
[45] Date of Patent: Jul. 6, 1999

[54] STORAGE-STABLE WATER-REPELLENT COMPOSITION FOR MASONRY MATERIALS

[75] Inventors: Anh Be; Donald Taylor Liles, both of Midland, Mich.; Francisco Gerardo Palencia Wilhelmi, Mexico, D.F., Mexico

[73] Assignee: Dow Corning Corporation, Midland, Mich.

[21] Appl. No.: 09/050,389

[22] Filed: Mar. 30, 1998

[51] Int. Cl.$^6$ .................................................. C09D 183/05
[52] U.S. Cl. .................... 106/287.14; 106/724; 106/806; 428/447
[58] Field of Search ............................. 106/287.14, 724, 106/806; 428/447

[56] References Cited

U.S. PATENT DOCUMENTS

| | | | |
|---|---|---|---|
| Re. 33,759 | 12/1991 | DePasquale et al. | 106/2 |
| 5,110,684 | 5/1992 | Cooper | 428/447 |
| 5,196,054 | 3/1993 | Schmuck et al. | 106/2 |

*Primary Examiner*—David Brunsman
*Attorney, Agent, or Firm*—Arne R. Jarnholm; Timothy J. Troy

[57] ABSTRACT

A storage-stable composition adapted for imparting water-repellent properties to masonry materials comprises an aqueous emulsion which defines a continuous aqueous phase and a discontinuous organosilicon phase. The emulsion is formulated from components comprising: (A) a water-insoluble alkoxysilane of the average general formula $R_n$—Si—$R'_{(4-n)}$ wherein n is a number from 1 to 2, R is a $C_5$–$C_{20}$ monovalent hydrocarbon radical and R' is a $C_1$–$C_4$ alkoxy group; (B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ $m^2$/sec at 25° C.; (C) an emulsifier; and (D) water. The discontinuous organosilicon phase comprises components (A) and (B) and the continuous aqueous phase comprising said water. Components (A) and (B) being present in the organosilicon phase in a weight ratio of (A):(B) such that said emulsion is physically and chemically stable after storage for six months at room temperature or for six weeks at 50° C.

15 Claims, No Drawings

STORAGE-STABLE WATER-REPELLENT COMPOSITION FOR MASONRY MATERIALS

BACKGROUND OF THE INVENTION

1. Field of the Invention

The present invention relates generally to water-repellent compositions adapted for use with masonry products and more particularly to such a water-repellent composition that is storage stable. The composition of the invention combines a relatively water-insoluble hydrolyzable silane and a hydrogen-functional polysiloxane in the form of an aqueous emulsion.

2. Description of the Prior Art

The beneficial effects of the using water-repellent compositions to protect masonry materials are well-known. As used herein, the term "masonry" means any porous inorganic substrate, particularly building compositions and including but not limited to structural ceramics, such as common brick, paving brick, face brick, sewer pipe, drain tile, hollow block, terra cotta, conduits, roofing tile, cements and plastics such as Portland cement, calcined gypsum products, i.e., molding and building plasters and stucco, magnesia cement, insulation products such as electrical insulators and natural and artificial stone. Because of their porosity, in the untreated condition these materials can readily absorb ambient moisture. Subsequent exposure to freezing temperatures can cause fracture, resulting in cracking and spalling. In the case of masonry materials used for constructing roads and bridges, the water repellent coatings also serve to protect the masonry materials from the deleterious effects of salt.

In U.S. Pat. No. Re. 33,759, DePasquale et al., there is disclosed a composition, in the form of an aqueous emulsion, for rendering masonry materials water-repellent. The claimed composition consists essentially of a hydrolyzable silane, or an oligomer thereof, an emulsifier having an HLB of from 4–15, and water. When prepared by the present inventors, the compositions of DePasquale et al. suffer from the drawback that they offer only limited shelf stability, which is exacerbated by exposure to heat.

In U.S. Pat. No. 5,110,684, Cooper, there is disclosed a water-repellent composition for masonry which includes a mixture of a water-soluble silane coupling agent and an emulsion of a hydrogen-functional polysiloxane. The composition of Cooper, however, also suffers from the drawback that it is has a very limited shelf life.

Thus, there exists a need for a water-repellent composition adapted for use with masonry products that is storage stable.

SUMMARY OF THE INVENTION

In accordance with the invention, there is provided a composition adapted for imparting water-repellent properties to masonry materials. The storage-stable water-repellent composition of the invention can be applied as a coating over the surface of a masonry substrate or may be mixed as an additive with settable masonry materials, such as concrete or calcined gypsum, prior to setting.

In accordance with the invention, the water repellent composition comprises an aqueous emulsion which defines a continuous aqueous phase and a discontinuous organosilicon phase. The emulsion is formulated from the components comprising: (A) a water-insoluble alkoxysilane of the average general formula $R_n$—Si—$R'_{(4-n)}$ wherein n is a number from 1 to 2, R is a $C_5$–$C_{20}$ monovalent hydrocarbon radical and R' is a $C_1$ to $C_4$ alkoxy group; (B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ m$^2$/sec at 25° C.; (C) an emulsifier; and (D) water. The discontinuous organosilicon phase comprises components (A) and (B) and the continuous aqueous phase comprises the water. The ratio of Components (A):(B) in the organosilicon phase is such that the emulsion exhibits both physical and chemical stability when stored at room temperature for six months or at 50° C. for six weeks. The organosilicon phase is present in the aqueous emulsion from about 10 to about 75 weight percent.

As used herein to describe water-repellent emulsion compositions, the term "stable" encompasses two phenomena: 1) physical stability; and 2) chemical stability.

The water-repellent emulsion compositions are of the oil-in-water type and physical instability occurs when the emulsion breaks. The suspended droplets which form the discontinuous organosilicon phase (also referred to as the oil phase or the disperse phase) agglomerate and are effectively removed from suspension in the continuous aqueous phase. Differences in density between the phases then leads to the formation of two distinct liquid layers. Thus, a physically stable emulsion retains a homogeneous appearance over time.

An emulsion may remain physically stable but not chemically stable. Chemical instability over time or exposure to heat is evidenced when the ability of the composition to exclude moisture, when applied to a masonry surface, is severely compromised. It is believed that chemical instability results when the organosilicon phase of the emulsion undergoes considerable hydrolysis and condensation (or partial cure) before application to a masonry material.

Measuring both chemical and physical stability can be carried out by simply observing the appearance and performance characteristics of a given water-repellent emulsion as a function of storage time at room temperature. Such aging tests can, however, be accelerated by the application of heat. Those skilled in the art will appreciate that the storage of a water-repellent emulsion at 50° C. for one week is generally equivalent to storage at room temperature for one month. Accordingly, as used herein, the term physically stable means that the emulsion remains unbroken when stored at room temperature for at least six months or 50° C. for six weeks. Likewise, as used herein, the term "chemically stable" means that, after storage at room temperature for six months or at 50° C. for six weeks, the emulsion exhibits at least 60 percent water exclusion ("%WE") as determined in accordance with a modified National Cooperative Highway Research Program protocol 244 (NCHRP 244). The modified NCHRP 244 protocol is identical in all respects to that specified in NCHRP244 except that water exclusion testing is carried out on mortar cubes that are 2 inches (5.08 cm) on a side, as opposed to 4 inches (10.16 cm) on a side.

The composition of the invention forms an excellent water-repellent barrier in the form of a resinous coating when applied to a masonry material. Curing of the composition is catalyzed by the residual alkalinity of the masonry material. The composition of the invention has surprisingly good heat and shelf stability. It is believed that the heat and shelf stability are attributable to the incorporation of the water-insoluble alkoxysilane and hydrogen-functional polysiloxane into the discontinuous organosilicon phase of the aqueous emulsion.

It is therefore an object of the present invention to provide a water-repellent composition in the form of an emulsion, adapted for use with masonry materials, that exhibits both physical and chemical stability.

It is another object of the invention to provide a water-repellent composition adapted for use with masonry materials that excludes water from masonry materials at least as well as prior art compositions.

DETAILED DESCRIPTION OF THE INVENTION

In accordance with the present invention, there is provided a physically and chemically stable composition adapted for imparting water-repellent properties to masonry materials. The composition of the present invention comprises: (A) a water-insoluble alkoxysilane; (B) a hydrogen-functional polysiloxane; (C) an emulsifier; and (D) water. The composition is in the form of an aqueous emulsion which includes a continuous aqueous phase and discontinuous organosilicon phase. When the composition contacts a masonry material, the water-insoluble alkoxysilane and the hydrogen-functional polysiloxane hydrolyze and condense with one another and hydroxide groups in the masonry, thus forming a resinous, water-repellent network. The hydrolysis and condensation reactions are catalyzed by the latent alkalinity of the masonry material.

Component (A) of the composition of the present invention is a water-insoluble alkoxysilane of the average general formula: $R_n$—Si—$R'_{(4-n)}$ wherein n is a number from 1 to 2, R is a $C_5$–$C_{20}$ monovalent hydrocarbon radical and R' is a $C_1$–$C_4$ alkoxy group.

As used herein to describe Component (A), the term "water-insoluble" means that less than one gram of the silane can be dissolved in 100 grams of water. This is an important difference between the present invention and the compositions of the prior art. It is believed that the use of a water-soluble silane coupling agent contributes to the limited shelf life of the composition of Cooper (U.S. Pat. No. 5,110,684). Water-soluble silane coupling agents undergo rapid hydrolysis and condensation when exposed to water. Applicants' use of a water-insoluble alkoxysilane permits incorporation of the silane into a discontinuous organosilicon phase in an aqueous emulsion. This avoids hydrolysis and condensation of the alkoxysilane until such time as the silane is in contact with a masonry material.

In the above-mentioned average general formula, R is a $C_5$–$C_{20}$ monovalent hydrocarbon radical. In hydrolyzable silanes where lower carbon radicals are employed, the silanes tend to be water-soluble. However, even hydrocarbon radicals in the $C_5$–$C_{20}$ range can render the alkoxy silane water soluble when certain groups, such as amino groups, are incorporated therein. Accordingly, R may be unsubstituted or substituted with various radicals but only insofar as such radicals do not cause the alkoxysilane to become water-soluble.

Because it imparts the cured composition with hydrophobicity, the R group in the above average general formula of the alkoxysilane (A) also plays an important role in the ability of the cured coating composition to exclude moisture. As a general rule, the higher the carbon content of the R group, the greater the hydrophobicity imparted to the cured coating. Nonetheless, alkoxysilanes having a $C_{20}$ R group is generally about the upper limit of what is commercially available. The present inventors have found it preferable that R is an n-octyl radical, because a very stable emulsion which imparts good hydrophobicity is achieved. It should be noted, however, that R may be a straight or branched alkyl group, an aryl group or an arylalkyl group.

R' is limited to a $C_1$–$C_4$ alkoxy group because higher carbon alkoxy groups tend to be less reactive. The value of n is a number between 2 and 3 and most preferably 3. Trialkoxysilanes are preferred because they form a three dimensional resinous network. Nonetheless, it should be recognized that dialkoxysilanes can be employed, as well as a mixture thereof with trialkoxysilane. Those skilled in the art will also appreciate that oligomeric hydrolyzates of the aforementioned alkoxysilanes are equivalents thereof.

The most preferred compound for use as Component (A), the water-insoluble alkoxysilane, is n-octyltriethoxysilane.

Component (B) of the composition of the invention is a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ m$^2$/sec at 25° C. and preferably between about $20 \times 10^{-6}$ and $100 \times 10^{-6}$ m$^2$/sec at 25° C. Component (B) may be a linear, branched or cyclic siloxane, or combinations thereof, and in addition to silicon-bonded hydrogen, may include alkyl, aryl and arylalkyl group. Thus, suitable compounds (having the requisite degree of polymerization to remain within the designated viscosity range) include alkylmethyl/methyl-hydrogen siloxane copolymers and methyl-hydrogen siloxanes.

If the kinematic viscosity of Component (B) is less than about $0.5 \times 10^{-6}$ m$^2$/sec at 25° C., it is too volatile to function effectively in the composition of the invention. In other words, the hydrogen-functional siloxane tends to evaporate before it can be hydrolyzed and condensed into the resin matrix when the composition is applied to a masonry surface. If the kinematic viscosity of Component (B) is greater than about $1,000 \times 10^{-6}$ m$^2$/sec at 25° C., then the coating composition cannot effectively infiltrate the porous surface of the masonry material. Most preferred for effective pore penetration of a masonry surface is a trimethylsiloxy end-capped dimethyl/methyl-hydrogen linear siloxane copolymer having three methyl-hydrogensiloxy and five dimethylsiloxy groups. A lower cost alternative for Component (B) is a trimethylsiloxy end-capped methyl-hydrogen linear siloxane having about sixty methyl-hydrogen siloxy groups.

Component (C) of the invention is an emulsifier. Ionic, nonionic and amphoteric emulsifiers may be used in the composition of the present invention although the nonionic polyoxyethylene lauryl ether type are preferred. In general, the amount of emulsifier may range from less than one percent up to about 20 percent of the combined weight of components (A), (B) and (D). The amount utilized will, of course, depend upon the efficacy of the particular surfactant. Typically, the amount of emulsifier (C) is between about one and three weight percent of the remaining components. Emulsifiers having an HLB value in the range of about 2 to 20 can be employed. Preferably, the emulsifier has a HLB value in the range of 4 to 17, which tends to produce a more stable emulsion. It will be appreciated by those skilled in the art that blends of various emulsifiers may also be used.

Component (D) is water and is preferably deionized or distilled water.

When combining components (A)–(D), it is preferred that the silicone components (A) and (B) be preblended, after which components (C) and (D), the emulsifier and water, may be added and blended in any order. Indeed, when component (B), the hydrogen-functional polysiloxane, is of a relatively low molecular weight (e.g. a trimethylsiloxy end-capped dimethyl/methyl-hydrogen linear siloxane copolymer having three methyl-hydrogensiloxy and five dimethylsiloxy groups) it must first be blended with component (A) the water-insoluble alkoxy silane, before combining with (C) the emulsifier and (D) water, or the emulsion composition of the invention will not be produced. Preferably, Component (C), an emulsifier, is separately mixed with (D) water. Thereafter, the two mixtures are combined in a single container and mixed for about 30 minutes. Finally, the resultant mixture is passed through a homogenizer (at about 7,500 psi or $5.17 \times 10^7$ Pa, one pass) or a sonaltor (at about 1,400 psi or $9.65 \times 10^6$ Pa, two passes) to produce the emulsion of the invention.

When Component (B) is a relatively high molecular weight hydrogen-functional polysiloxane (e.g. a trimethylsiloxy end-capped methyl-hydrogen linear siloxane having sixty methyl-hydrogen siloxy groups and a kinematic viscosity of $30 \times 10^{-6}$ m$^2$/sec) all components (A)–(D) may be added to a container and mixed. Emulsification can be augmented by shaking and using a homogenizer or subjecting the mixture to ultrasonic energy.

The discontinuous organosilicon phase may comprise between 10 and 75 weight percent of the aqueous emulsion but preferably comprises about 40 to 60 weight percent of the emulsion.

The ratio of Component (A):Component (B) is such that the emulsion exhibits both physical stability and chemical stability when storged at room temperature for six months or at 50° C. for six weeks.

When the molecular weight of Component (B) is relatively low (e.g. a trimethylsiloxy end-capped dimethyl/methyl-hydrogen linear siloxane copolymer having three methyl-hydrogensiloxy and five dimethylsiloxy groups) the weight ratio of Component (A):Component (B) is preferably from 10:90 to about 90:10. When the molecular weight of Component (B) is relatively high (e.g. a trimethylsiloxy end-capped methyl-hydrogen linear siloxane having sixty methyl-hydrogen siloxy groups) the preferred weight ratio of Component (A):Component (B) is about 1:3.

It is believed, however, that weight ratios weight Component (A):Component (B) greater than 90:10 can still result in emulsions that exhibit both chemical and physical stability, particularly when the pH of the emulsion is maintained at about 4 or 5. A pH in this range inhibits the hydrolysis and condensation of Components (A) and (B) in the organosilicon phase. This can readily be accomplished by the addition of a relatively weak acid, such as glacial acetic acid, to the emulsion.

Various features and advantages of the invention are illustrated by example, below. With respect to Examples 1–5 of the Invention, and Comparative Examples 1–3, the percent water exclusion ("%WE") attributable to the emulsion was determined in accordance with the aforementioned modified National Cooperative Highway Research Program 244 protocol (NCHRP 244), using 5.08×5.08×5.08 cm cubes cast from Type III mortar, prepared in accordance with ASTM C 109. The depth of penetration was measured by cracking a treated block and subjecting the fracture surface to a 1% solution of sulfanazo 111 dye. The depth of penetration corresponded to unstained depth measured at the fracture surface.

EXAMPLE 1 OF THE INVENTION 0.8 g of polyoxyethylene (4) lauryl ether (HLB=9.7, Brij® 30 from ICI Americas, Inc. of Wilmington, Delaware), 1.1 g of 72% aqueous solution of polyoxyethylene (23) lauryl ether (HLB=16.9, Brij® 35, also from ICI Americas, Inc.) and 58.3 g of deionized water were mixed for 15 minutes. 36 g of trimethylsiloxy end-capped dimethyl/methyl-hydrogen linear siloxane copolymer having three methyl-hydrogensiloxy and five dimethylsiloxy groups and a kinematic viscosity of $10 \times 10^{-6}$ m$^2$/sec and 4 g of n-octyltriethoxysilane were mixed for five minutes and added thereto. Mixing was continued for an additional 30 minutes and the resultant mixture was then subjected to one pass through a homogenizer at about 7,500 psi or $5.17 \times 10^7$ Pa. This resulted in an oil-in-water emulsion having a mean particle size of 400 nm.

The %WE (percent water exclusion) imparted by the fresh emulsion was 84. The fresh emulsion penetrated the block to a depth of 3.5 mm. The fresh emulsion was thereafter subjected to aging by storage at 50° C. for six weeks. The aged emulsion remained unbroken and the %WE imparted by thereby was 80.7.

EXAMPLE 2 OF THE INVENTION 0.8 g of polyoxyethylene (4) lauryl ether (HLB=9.7, Brij® 30), 1.1 g of 72% aqueous solution of polyoxyethylene (23) lauryl ether (HLB=16.9, Brij® 35) and 58.3 g of deionized water were mixed for 15 minutes. 20 g of trimethylsiloxy end-capped dimethyl/methyl-hydrogen linear siloxane copolymer having three methyl-hydrogensiloxy and five dimethylsiloxy groups and a kinematic viscosity of $10 \times 10^{-6}$ m$^2$/sec and 20 g of n-octyltriethoxysilane were mixed for five minutes and added thereto. Mixing was continued for an additional 30 minutes and the resultant mixture was then subjected to one pass through a homogenizer at about 7,500 psi or $5.17 \times 10^7$ Pa. This resulted in an oil-in-water emulsion having a mean particle size of 400 nm.

The %WE imparted by the fresh emulsion was 80.5. The fresh emulsion penetrated the block to a depth of 6 mm. The fresh emulsion was thereafter subjected to aging by storage at 50° C. for six weeks. The aged emulsion remained unbroken and the %WE imparted by thereby was 80.8.

EXAMPLE 3 OF THE INVENTION

An emulsion composition was prepared in a manner identical to that described in connection with EXAMPLE 1 OF THE INVENTION except that the amount of polyoxyethylene (4) lauryl ether was reduced to 0.6 g, from 0.8 g.

The %WE imparted by the fresh emulsion was 83.4. The fresh emulsion penetrated the block to a depth of 4.5 mm. The fresh emulsion was thereafter subjected to aging by storage at 50° C. for six weeks. The aged emulsion remained unbroken and the %WE imparted by thereby was 83.6. The aged solution also penetrated the block to a depth of 5 mm.

EXAMPLE 4 OF THE INVENTION 1.45 g of 72% aqueous solution of polyoxyethylene (23) lauryl ether (HLB=16.9, Brij® 35) and 58.3 g of deionized water were mixed for 15 minutes. 20 g of trimethylsiloxy end-capped dimethyl/methyl-hydrogen linear siloxane copolymer having three methyl-hydrogensiloxy and five dimethylsiloxy groups and a kinematic viscosity of $10 \times 10^{-6}$ m$^2$/sec and 20 g of n-octyltriethoxysilane were mixed for five minutes and added thereto. Mixing was continued for an additional 30 minutes and the resultant mixture was then subjected to one pass through a homogenizer at about 7,500 psi or $5.17 \times 10^7$ Pa. This resulted in an oil-in-water emulsion having a mean particle size of 400 nm.

The %WE imparted by the fresh emulsion was 89. The fresh emulsion penetrated the block to a depth of 3.5 mm.

The fresh emulsion was thereafter subjected to aging by storage at 50° C. for six weeks. The aged emulsion remained unbroken and the %WE imparted thereby was 77.5.

EXAMPLE 5 OF THE INVENTION 0.8 g of polyoxyethylene (4) lauryl ether (HLB=9.7, Brij® 30), 1.1 g of 72% aqueous solution of polyoxyethylene (23) lauryl ether (HLB=16.9, Brij® 35) and 58.3 g of deionized water were mixed for 15 minutes. 4 g of trimethylsiloxy end-capped dimethyl/methyl-hydrogen linear siloxane copolymer having three methyl-hydrogensiloxy and five dimethylsiloxy groups and a kinematic viscosity of $10\times10^{-6}$ m$^2$/sec and 36 g of n-octyltriethoxysilane were mixed for five minutes and added thereto. Mixing was continued for an additional 30 minutes and the resultant mixture was then subjected to one pass through a homogenizer at about 7,500 psi or $5.17\times10^7$ Pa. This resulted in an oil-in-water emulsion having a mean particle size of 400 nm.

The %WE imparted by the fresh emulsion was 84.5. The fresh emulsion penetrated the block to a depth of 6.3 mm. The fresh emulsion was thereafter subjected to aging by storage at 50° C. for six weeks. The aged emulsion remained unbroken and the %WE imparted thereby was 82.8.

COMPARATIVE EXAMPLE 1

0.8 g of polyoxyethylene (4) lauryl ether (HLB=9.7, Brij® 30), 1.1 g of 72% aqueous solution of polyoxyethylene (23) lauryl ether (HLB=16.9, Brij® 35) and 58.3 g of deionized water were mixed for 15 minutes. 40 g of n-octyltriethoxy silane was added thereto and mixing was continued for an additional 30 minutes. The resultant mixture was then subjected to one pass through a homogenizer at about 7,500 psi or $5.17\times10^7$ Pa.

The % WE imparted by the fresh emulsion was 78.2. The fresh emulsion penetrated the block to a depth of 5 mm. The fresh emulsion was thereafter subjected to aging by storage at 50° C. for six weeks. The aged emulsion remained unbroken but the % WE imparted thereby was 28.5. Thus, the lack of any hydrogen-functional polysiloxane in the formulation rendered a chemically unstable composition.

COMPARATIVE EXAMPLE 2

0.8 g of polyoxyethylene (4) lauryl ether (HLB=9.7, Brij® 30), 1.1 g of 72% aqueous solution of polyoxyethylene (23) lauryl ether (HLB=16.9, Brij® 35) and 58.3 g of deionized water were mixed for 15 minutes. 40 g of propyltrimethoxysilane were then added and mixing continued for an additional thirty minutes. The resultant mixture was then subjected to one pass through a homogenizer at about 7,500 psi or $5.17\times10^7$ Pa. This resulted in an aqueous emulsion having a mean particle size of 400 nm.

The %WE imparted by the fresh emulsion was 50. The fresh emulsion penetrated the block to a depth of 1 mm. The fresh emulsion was not thereafter subjected to aging. Thus, the lack of any hydrogen-functional polysiloxane in the formulation and the use of propyltrimethoxy silane (an alkoxysilane that is not considered to be a water-insoluble alkoxy silane as defined by the limitations associated with Component (A) of the invention) does yields a composition having unacceptable water-repellent efficacy.

COMPARATIVE EXAMPLE 3

0.6 g of polyoxyethylene (4) lauryl ether (HLB=9.7, Brij® 30), 1.1 g of 72% aqueous solution of polyoxyethylene (23) lauryl ether (HLB=16.9, Brij® 35) and 58.3 g of deionized water were mixed for 15 minutes. Thereafter, 20 g of n-octyltriethoxysilane was added and mixing continued for thirty minutes. Next, 20 g of trimethylsiloxy end-capped dimethyl/methyl-hydrogen linear siloxane copolymer having three methyl-hydrogensiloxy and five dimethylsiloxy groups and a kinematic viscosity of $10\times10^{-6}$ m$^2$/sec was added and mixing continued for another thirty minutes. Finally, the resultant mixture was subjected to one pass through a homogenizer at about 7,500 psi or $5.17\times10^7$ Pa. This resulted in an aqueous emulsion having a mean particle size of 400 nm.

The % WE imparted by the fresh emulsion was 80.8. The fresh emulsion penetrated the block to a depth of 5.5 mm. The fresh emulsion was thereafter subjected to aging by storage at 50° C. for six weeks. The aged emulsion remained unbroken and the % WE imparted thereby was 30.2. The depth of penetration of the aged emulsion was 1 mm. These results should be compared with those obtained in EXAMPLE 2 OF THE INVENTION. It can then be seen that when a lower molecular weight hydrogen-functional polysiloxanes is used as component (B), it is necessary to blend components (A) and (B) before the addition of (C) the emulsifier and (D) water. A failure to mix the components in the requisite order can potentially produce a composition that is chemically unstable.

EXAMPLE 6 OF THE INVENTION 157.5 g of a trimethylsiloxy end-capped methyl-hydrogen linear siloxane having sixty methyl-hydrogen siloxy groups and a kinematic viscosity of $30\times10^{-6}$ m$^2$/sec, 52.5 g of n-octyltriethoxysilane, 4.2 g of polyoxyethylene (4) lauryl ether (HLB=9.7, Brij® 30) and 19.5 g of a 28 percent aqueous solution of polyoxyethylene (23) lauryl ether (HLB=16.9, Brij® 35) and 116.3 g of deionized water were combined in a container. The contents of the container were shaken for several minutes and separated into 40 g batches in individual jars. The tip of an ultrasonic probe was positioned approximately ⅜ inch (1 cm) below the surface of the liquid in the center of each jar. The probe was energized to a setting of between 40–55% (the ultrasonic processor was rated at 475 watts maximum power) and the mixture was processed under these conditions for 30 seconds. An emulsion formed within several seconds of energizing the probe as noted by a milky white appearance which formed and remained. The probe was removed from the jar, the cap was installed and the mixture was shaken for 10–15 seconds and placed in a stream of cold running water for 1 minute in order to cool the jar and its contents. The probe was reinserted as previously described and energized for another 30 second period. The cap was installed and the jar was shaken again followed by cooling in cold running water. The process was repeated several more times such that the contents of each jar were processed with the ultrasonic probe for a total of 2.5 minutes. The contents of the jars was then combined and mixed to form a single composition. This composition consisted of a 60 percent by weight aqueous, oil-in-water emulsion of which the oil phase consisted of 75 percent by weight polymethylhydrogensiloxane and 25 percent by weight n-octyltriethoxysilane. The weight ratio of the n-octyltriethoxysilane (A) to the hydrogen-functional polysiloxane (B) was 25:75. The mean particle size of the discontinuous organosilicon phase was 435 nm.

250 g of the resultant emulsion was diluted in 5 kg of water and placed in a trough. This provided a bath having an organosilicon content of about three weight percent. A preweighed composite board (which included cured cement and cellulose fiber, having the dimensions 320×120×8 mm and manufactured by Duralita Corporation of Guatemala) was submerged in the bath for 12 seconds. The board was the removed from the bath and allowed to stand for two minutes to permit the surface water to dissipate and was then reweighed. The difference in weight prior to and after submersion was used to calculate the amount of diluted organosilicon emulsion that was absorbed by the board, which was 5.9 percent of the dry weight.

The board was then permitted to dry for seven days and again weighed. The dried board was then submerged to a depth of 20 inches (50.8 cm) in a water bath for two hours, removed, patted dry and reweighed to determine the weight percent of water absorbed, which was 1.9 percent.

The test was repeated with a second board and the amount of organosilicon emulsion that was absorbed was 5.7 weight percent. The amount of water absorbed after treatment was found to be 1.8 weight percent.

Finally, the emulsion was stored at room temperature and periodically observed for a period of one year. It was found to have physical stability (i.e. remained unbroken) over that period of time.

EXAMPLE 7 OF THE INVENTION

An emulsion similar to that of EXAMPLE 6 OF THE INVENTION was prepared by first mixing 33.4g of polyoxyethylene (23) lauryl ether solution (BRIJ® 35, 72% active in water) in 547.0g of hot (60° C.) tap water in a 2 qt. jar for 30 minutes in order to form a solution. Next 225 g of n-octyltriethoxysilane, 675 g of trimethylsiloxy end-capped dimethyl/methyl-hydrogen linear siloxane copolymer having three methyl-hydrogensiloxy and five dimethylsiloxy groups and a kinematic viscosity of $10 \times 10^{-6}$ m$^2$/sec, 18 g of polyoxyethylene (4) lauryl ether (BRIJ® 30) and 1.6 g of glacial acetic acid were added. The contents of the jar were stirred for one hour to form a dispersion. The dispersion was processed ultrasonically by pumping the liquid into a stainless steel cylinder which was equipped with an inlet and outlet port and also to which had been fitted an ultrasonic horn. The liquid which exited from the ultrasonic processor had the appearance of a white milky liquid and it was collected in another jar and when the entire charge had been processed, it was passed again through the ultrasonic device for a second time. The composition consisted of a 60% active aqueous emulsion, the discontinuous organosilicon phase (active phase) of which consisted of 75% by weight trimethylsiloxy end-capped methyl-hydrogen linear siloxane and 25% n-octyltriethoxysilane. The organosilicon phase of the emulsion had a mean particle size (light scattering using a NIACOMP 370 Submicron Particle Sizer) of 563 nm with 99% of the particles being less than 1420 nm. The emulsion also contained 0.18% acetic acid based on active ingredients.

Two cement boards were treated and tested using the same procedure as described in EXAMPLE 6 OF THE INVENTION. The weight percent of organosilicon emulsion absorbed by the boards was 6.3 and 6.4 weight percent. The amount of water pick-up was 2.4 and 2.5 weight percent.

Finally, the emulsion was stored at room temperature and periodically observed for one year. The emulsion remained unbroken for that time. Accordingly, premixing of the organosilicon Components (A) and (B) does not appear to be necessary when higher molecular weight hydrogen functional polysiloxanes are used as Component (B).

COMPARATIVE EXAMPLE 4

An emulsion similar to the emulsion of EXAMPLE 6 OF THE INVENTION was prepared in a like manner except that it contained only n-octyltriethoxysilane and no hydrogen-functional polysiloxane. 13.4 g of polyoxyethylene (23) lauryl ether solution (BRIJ® 35L, 72% active in water) blended with 218.0 g of hot (60° C.) tap water in a 2 qt. jar for 30 minutes in order to form a solution. Next 360 g of n-octyltriethoxysilane, 7.2 g of polyoxyethylene (4) lauryl ether (BRIJ® 30) and 0.7 g of glacial acetic acid were added. The contents of the jar were stirred for one hour to form a dispersion. The dispersion was processed ultrasonically by pumping the liquid into a stainless steel cylinder which was equipped with an inlet and outlet port and also to which had been fitted an ultrasonic horn. The liquid which exited from the ultrasonic processor had the appearance of a white milky liquid and it was collected in another jar and when the entire charge had been processed, it was passed again through the ultrasonic device for a second time. The composition consisted of a 60% active aqueous emulsion. The discontinuous organosilicon phase (active phase) consisted entirely of n-octyltriethoxysilane. The emulsion had a mean particle size (light scattering using a NIACOMP® 370 Submicron Particle Sizer) of 514 nm with 99% of the particles <1447 nm. The emulsion also contained 0.2% acetic acid based on active ingredients.

Two cement boards were treated and tested using the same procedure as described in EXAMPLE 6 OF THE INVENTION. The weight percent of organosilicon emulsion absorbed by the boards was 6.1 and 6.2 weight percent. The amount of water pick-up was 2.9 and 4.8 weight percent.

Finally, the emulsion was stored at room temperature and periodically observed. The emulsion was broken after one week. Thus, a failure to include a hydrogen-functional polysiloxane in the formulation results in an emulsion that is physically unstable.

From the foregoing EXAMPLES 1–7 OF THE INVENTION, it can clearly be seen that the aqueous emulsions made in accordance with the present invention exhibit excellent water-repellent properties, even if diluted. Furthermore, when the %WE of the heat-aged emulsions of Examples 1–5 of the invention are compared to the results disclosed in COMPARATIVE EXAMPLES 1–4, and the aging results of EXAMPLES 6 and 7 OF THE INVENTION are compared to the results of COMPARATIVE EXAMPLE 5, the extraordinary physical and chemical stability exhibited by the emulsions of the invention are demonstrated.

Those skilled in the art will appreciate the novel composition of the invention can be used to impart the surface of masonry substrates with a cured water-repellent coating by coating the surface therewith and permitting the composition to cure. In an analogous manner, the composition of the invention can be blended with settable masonry compositions, such as mortar or gypsum, to impart the set composition with water-repellent properties.

Although various features and advantages of the heat- and age-stable compositions of the present invention have been demonstrated above by way of example, the scope of the present invention is not so-limited and should be judged only in accordance with the following claims and equivalents thereof.

What is claimed is:

1. A storage-stable composition comprising an aqueous emulsion which defines a continuous aqueous phase and a discontinuous organosilicon phase;

said emulsion being formulated from components comprising:

(A) a water-insoluble alkoxysilane of the average general formula:

$R_n$—Si—$R'_{(4-n)}$ wherein n is a number from 1 to 2, R is a $C_5$–$C_{20}$ monovalent hydrocarbon radical and R' is a $C_1$–$C_4$ alkoxy group;

(B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ $m^2$/sec at 25° C.;

(C) an emulsifier; and (D) water said discontinuous organosilicon phase comprising components (A) and (B) and said continuous aqueous phase comprising said water;

said components (A) and (B) being present in said organosilicon phase in a weight ratio of (A):(B) such that said emulsion is physically and chemically stable after storage for six months at room temperature or for six weeks at 50° C.; and said organosilicon phase being present in said aqueous emulsion in an amount from about 10 to about 75 weight percent.

2. A composition in accordance with claim 1 wherein said Component (B) is weight ratio of components (A):(B) is from 10:90 to 90:10.

3. A composition in accordance with claim 1 wherein said Component (B) is a trimethylsiloxy end-capped dimethyl/methyl-hydrogen linear siloxane copolymer having three methyl-hydrogensiloxy and five dimethylsiloxy groups and a kinematic viscosity of $10 \times 10^{-6}$ $m^2$/sec.

4. A composition in accordance with claim 3 wherein the weight ratio of Components (A):(B) is from 10:90 to 90:10.

5. A composition in accordance with claim 1 wherein said component (B) is a trimethylsiloxy end-capped dimethyl/methyl-hydrogen linear siloxane copolymer having three methyl-hydrogensiloxy and five dimethylsiloxy groups and a kinematic viscosity of $10 \times 10^{-6}$ $m^2$/sec.

6. A composition in accordance with claim 5 wherein the weight ratio of Components (A):(B) is about 1:3.

7. A composition in accordance with claim 1 wherein said (C) emulsifier has an HLB value of 2–20.

8. A composition in accordance with claim 7 wherein said (C) emulsifier has an HLB value of 4–17.

9. A composition in accordance with claim 1 wherein said emulsifier is a polyoxyethylene lauryl ether.

10. A composition in accordance with claim 1 further comprising an acid in an amount sufficient to impart the composition with a pH of 4–5.

11. A composition in accordance with claim 1 wherein said organosilicon phase is present in said aqueous emulsion in an amount from about 40 to about 60 weight percent.

12. An article of manufacture comprising:

a masonry substrate;

said masonry substrate presenting at least one surface;

said at least one surface being coated the a cured water-repellent coating composition;

said cured water-repellent coating composition being formed from an aqueous emulsion which defines a continuous aqueous phase and a discontinuous organosilicon phase;

said emulsion being formulated from components comprising:

(A) a water-insoluble alkoxysilane of the average general formula:

$R_n$—Si—$R'_{(4-n)}$ wherein n is a number from 1 to 2, R is a $C_5$–$C_{20}$ monovalent hydrocarbon radical and R' is a $C_1$–$C_4$ alkoxy group;

(B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ $m^2$/sec at 25° C.;

(C) an emulsifier; and (D) water said discontinuous organosilicon phase comprising components (A) and (B) and said continuous aqueous phase comprising said water;

said components (A) and (B) being present in said organosilicon phase in a weight ratio of (A):(B) such that said emulsion is physically and chemically stable after storage for six months at room temperature or for six weeks at 50° C.; and said organosilicon phase being present in said aqueous emulsion in an amount from about 10 to about 75 weight present.

13. A method of making a storage-stable composition comprising an aqueous emulsion which defines a continuous aqueous phase and a discontinuous organosilicon phase comprising the steps of:

(I) blending components comprising:

(A) a water-insoluble alkoxysilane of the average general formula:

$R_n$—Si—$R'_{(4-n)}$ wherein n is a number from 1 to 2, R is a $C_5$–$C_{20}$ monovalent hydrocarbon radical and R' is a $C_1$–$C_4$ alkoxy group; and (B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ $m^2$/sec at 25° C.; and (II) combining the blend obtained in step (I) with:

(C) an emulsifier; and (D) water; and (III) emulsifying the combination obtained in step (II) to form said emulsion wherein:

said discontinuous organosilicon phase comprises components (A) and (B) and said continuous aqueous phase comprises (D) said water;

said components (A) and (B) being present in said organosilicon phase in a weight ratio of (A):(B) such that said emulsion is physically and chemically stable after storage for six months at room temperature or for six weeks at 50° C.; and said organosilicon phase being present in said aqueous emulsion in an amount from about 10 to about 75 weight percent.

14. A method of imparting a masonry substrate with a water-repellent coating, said masonry substrate presenting at least one surface, said method comprising the step of coating said at least one surface with an aqueous emulsion which defines a continuous aqueous phase and a discontinuous organosilicon phase;

said emulsion being formulated from components comprising:

(A) a water-insoluble alkoxysilane of the average general formula:

$R_n$—Si—$R'_{(4-n)}$ wherein n is a number from 1 to 2, R is a $C_5$–$C_{20}$ monovalent hydrocarbon radical and R' is a $C_1$–$C_4$ alkoxy group;

(B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ $m^2$/sec at 25° C.;

(C) an emulsifier; and (D) water said discontinuous organosilicon phase comprising components (A) and (B) and said continuous aqueous phase comprising said water;

said components (A) and (B) being present in said organosilicon phase in a weight ratio of (A):(B) such that said emulsion is physically and chemically stable after storage for six months at room temperature or for six weeks at 50° C.; and said organosilicon phase being present in said aqueous emulsion in an amount from about 10 to about 75 weight percent.

15. A method of imparting a settable masonry composition with water-repellent properties, said method comprising the step of blending said settable masonry composition with an aqueous emulsion which defines a continuous aqueous phase and a discontinuous organosilicon phase;

said emulsion being formulated from components comprising:

(A) a water-insoluble alkoxysilane of the average general formula:

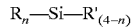

wherein n is a number from 1 to 2, R is a $C_5$–$C_{20}$ monovalent hydrocarbon radical and R' is a $C_1$–$C_4$ alkoxy group;

(B) a hydrogen-functional polysiloxane having at least two silicon-bonded hydrogen atoms per molecule, at least five siloxy units per molecule and a kinematic viscosity between about $0.5 \times 10^{-6}$ and $1,000 \times 10^{-6}$ $m^2$/sec at 25° C.;

(C) an emulsifier; and (D) water said discontinuous organosilicon phase comprising components (A) and (B) and said continuous aqueous phase comprising said water;

said components (A) and (B) being present in said organosilicon phase in a weight ratio of (A):(B) such that said emulsion is physically and chemically stable after storage for six months at room temperature or for six weeks at 50° C.; and said organosilicon phase being present in said aqueous emulsion in an amount from about 10 to about 75 weight percent.

* * * * *